United States Patent
Tian et al.

(10) Patent No.: US 10,250,070 B2
(45) Date of Patent: Apr. 2, 2019

(54) LINE POWER CONTROL METHOD AND SYSTEM FOR UNIFIED POWER FLOW CONTROLLER

(71) Applicants: NR Electric Co., Ltd., Nanjing, Jiangsu (CN); NR Electric Engineering Co., Ltd., Nanjing, Jiangsu (CN)

(72) Inventors: Jie Tian, Jiangsu (CN); Lei Pan, Jiangsu (CN); Chao Liu, Jiangsu (CN); Quanrong Shen, Jiangsu (CN); Haiying Li, Jiangsu (CN); Yu Lu, Jiangsu (CN); Yunlong Dong, Jiangsu (CN)

(73) Assignees: NR Electric Co., Ltd., Nanjing, Jiangsu (CN); NR Electric Engineering Co., Ltd., Nanjing, Jiangsu (CN)

( * ) Notice: Subject to any disclaimer, the term of this patent is extended or adjusted under 35 U.S.C. 154(b) by 203 days.

(21) Appl. No.: 15/324,744

(22) PCT Filed: Jan. 22, 2015

(86) PCT No.: PCT/CN2015/071273
§ 371 (c)(1),
(2) Date: Jan. 9, 2017

(87) PCT Pub. No.: WO2016/004756
PCT Pub. Date: Jan. 14, 2016

(65) Prior Publication Data
US 2017/0199502 A1    Jul. 13, 2017

(30) Foreign Application Priority Data

Jul. 10, 2014 (CN) .......................... 2014 1 0328092

(51) Int. Cl.
*H02J 3/24*    (2006.01)
*H02J 13/00*   (2006.01)
(Continued)

(52) U.S. Cl.
CPC .............. *H02J 13/00* (2013.01); *G05B 15/02* (2013.01); *H02J 3/1814* (2013.01); *H02J 3/24* (2013.01); *Y02E 60/74* (2013.01); *Y04S 10/30* (2013.01)

(58) Field of Classification Search
CPC . H02J 13/00; H02J 3/1814; H02J 3/24; G05B 15/02
See application file for complete search history.

(56) References Cited

FOREIGN PATENT DOCUMENTS

| CN | 103138255 | 6/2013 |
| CN | 103414185 | 11/2013 |

(Continued)

OTHER PUBLICATIONS

Wikipedia contributors. "Unified power flow controller." Wikipedia, The Free Encyclopedia. Wikipedia, The Free Encyclopedia, Jan. 16, 2019. Web. Jan. 18, 2019. (Year: 2019).*

(Continued)

*Primary Examiner* — Daniel J Cavallari
(74) *Attorney, Agent, or Firm* — Rankin, Hill & Clark LLP

(57) ABSTRACT

A line power control method and system for a unified power flow controller includes outer loop line power control, inner loop valve side current control, and converter valve control. Series-side converter valve side current reference values $I_{sedref}$ and $I_{seqref}$ are calculated by means of the outer loop line power control according to line power instructions $P_{ref}$ and $Q_{ref}$ that are input, a measured line power $U_L$, and measured line power $P_{line}$ and $Q_{line}$; a converter output voltage reference value $U_{cref}$ is calculated by means of the inner valve side current control according to the valve side current reference values that are output by means of the outer loop power control, a measured valve side current, and a measured valve side voltage; and finally, a converter (Continued)

outputs, according to the voltage reference value, a corresponding voltage to control line power to achieve a reference value.

10 Claims, 2 Drawing Sheets

(51) Int. Cl.
*H02J 3/18* (2006.01)
*G05B 15/02* (2006.01)

(56) References Cited

FOREIGN PATENT DOCUMENTS

| CN | 203352168 | 12/2013 | |
|---|---|---|---|
| CN | 104052073 | 9/2014 | |
| WO | WO-9945623 A1 * | 9/1999 | ............ H02J 3/18 |

OTHER PUBLICATIONS

International Search Report of PCT/CN2015/071273 dated Apr. 20, 2015, 6 pages (English and Chinese).

Zhu et al.: "Analysis and Study on Control Strategy for UPFC", Automation of Electric Power Systems, Jan. 10, 2006, vol. 30, No. 1, ISSN 1000-1026 (with English Abstract).

* cited by examiner

LINE POWER CONTROL METHOD AND SYSTEM FOR UNIFIED POWER FLOW CONTROLLER

TECHNICAL FIELD

The present invention relates to the field of flexible power transmission in a power system, and specially to a line power control method and system for a unified power flow controller.

RELATED ART

With the interconnection of large-scale power systems and the application of various novel equipment, power generation and power transmission become more economic and more efficient, and the scale and complexity of the power systems are also increased. In addition, as a large quantity of distributed power generation systems are connected to a power grid, the traditional transmission direction of the power flow from a transmission grid to a distribution grid is reversed. Due to the constantly increasing user load, there is a need of a power flow control method to improve the existing power transmission capacity. The complex power exchange between fast-developing smart grids and power markets requires frequent power flow control.

Unified power flow controller (UPFC) is currently the most universal power flow control device. It consists of two identical voltage source converters that are connected by using a common DC port, and can be considered as being formed by one static synchronous compensator (STATCOM) and one static synchronous series compensator (SSSC) connected in parallel. Different control functions such as parallel compensation, series compensation and phase shift can be rapidly implemented separately or simultaneously by simply changing the control law, thereby improving the performance of the power system.

The basic structure of the UPFC is as shown in FIG. 1. In FIG. 1, 1 represents a parallel transformer, 2 represents back-to-back voltage source converters, 3 represents a series transformer, and 4 represents a controlled AC line. The UPFC includes a parallel-side converter and one or more series-side converters, and further includes a parallel-side transformer, a series-side transformer, a feeder switch of the parallel-side transformer, a bypass switch of the series-side transformer, and so on. The UPFC can implement multi-objective coordinated control. The parallel-side transformer can control a DC voltage and a voltage or reactive power of an AC grid-tied point, and the series-side converter can implement terminal voltage, phase-shift control, impedance control, or direct power flow control of the line. UPFCs using different topological converters have different control strategies. At present, existing unified power flow controllers that have found engineering application in the world all use series connection of GTO devices, low-level converter bridges, and transformer multi-structure converters. The converter has a complex structure and poor reliability, and requires high maintenance costs. The control protection system has relatively poor expansibility, portability and maintainability. With the continuous development of power semiconductor devices, voltage source converters that consist of novel devices such as IGBT are widely applied in the field of flexible DC transmission. Researches on the control strategy of UPFCs including an IGBT-based low-level converter have been carried out in universities and scientific research institutions in China. However, the low-voltage converter has a high switching frequency and great loss, and contains a lot of harmonics, and therefore has not found engineering application. Due to the modular feature of a modular multilevel converter (MMC), voltage and capacity levels can be easily expanded, facilitating the engineering application of the UPFC. In addition, the MMC has a relatively low switching frequency, which can reduce the loss of the converter, thereby improving the reliability of the voltage source converter.

Regardless of terminal voltage control, phase-shift control or impedance control, the final objective of the power system is to change the power flow of the line. Therefore, using the UPFC to control the power of the line the a most direct and most efficient method. For a UPFC using the novel topological structure MMC, researches on the related strategy have been carried out in universities. In the "Control Strategy Simulation of UPFC Based on Modular Multilevel Converters" (Power System Protection and Control, 2012, 40 (3), 74 to 77) by Zhang Zhenhua, et al., a nonlinear system is decoupled by using feedback linearization, variable structure control is introduced after the system is linearized, and design of controllers respectively for the parallel-side and the series-side is completed. The control strategy includes three sections, that is, a power outer loop, a voltage inner loop, and a current inner loop. The power outer loop controls an output to obtain a reference value of inner loop voltage control. Although active power and reactive power can be adjusted independently, the control system is complex and has a low reliability, and therefore is not suitable for engineering application.

In the "Study on Control of the Unified Power Flow Controller Based on Modular Multilevel Converter" (Master's theses of China Electric Power Research Institute, 2013, 6) by Zheng Bowen, a capacitor is connected in parallel with the series-side converter, a single closed-loop PID is utilized to control a series-side output voltage control system for the UPFC, and a filter capacitor is introduced into the control system, affecting the response speed of controlling power of the line. In addition, the UPFC device controls a series-side voltage directly by using the PID, but its transient response to a valve side current is relatively slow, affecting transient control of the UPFC system.

To improve the speed and accuracy of unified power flow controllers, make full use of the power flow optimization feature thereof, and promote the rapid development of application of unified power flow controllers, it is necessary to provide a line power control method for unified power flow controllers that is more reliable and more suitable for engineering application.

BRIEF DESCRIPTION

An objective of the present invention is to provide a line power control method and system for a unified power flow controller, which are simple, practical, and highly reliable, can rapidly and accurately control the power of a line, and can implement independent decoupling control of active power and reactive power of the line.

To achieve the foregoing objective, the following solutions are used in the present invention:

a line power control method for a unified power flow controller, including: generating, by means of outer loop line power control, a valve side current reference value; generating, by means of inner loop valve side current control, a converter output voltage reference value; and outputting, by means of converter control according to the voltage reference value, a corresponding voltage to control line power.

According to the foregoing line power control method for a unified power flow controller, the generating, by means of outer loop line power control, a valve side current reference value specifically refers to that: calculating a line current instruction by means of the outer loop line power control according to an input power instruction and a measured line alternating voltage, and summing the calculated line current instruction and an output value that is obtained by performing a proportional integral operation on a difference between a line power instruction and measured line power, to obtain an outer loop valve side current reference value. In the foregoing line power control method for a unified power flow controller, the generating, by means of inner loop valve side current control, a converter output voltage reference value specifically refers to that: a converter output voltage reference value is calculated by means of the inner loop valve side current control according to the valve side current reference value that is input, a measured valve side alternating current, and a measured valve side alternating voltage.

According to the foregoing line power control method for a unified power flow controller, after dq transformation is performed on the measured line alternating voltage, calculation is performed on a transformed voltage and the line power instruction to obtain a dq component of the line current instruction, correspondingly, a line current instruction that is used for summation is the dq component of the line current instruction.

According to the foregoing line power control method for a unified power flow controller, after dq transformation is performed on the measured valve side alternating current and the measured valve side alternating voltage, calculation is performed on the transformed current, the transformed voltage, a value of a reactor of a bridge, and a dq component of the valve side current reference value to obtain a dq component of the converter output voltage reference value, and then dq reverse transformation is performed on the dq component to obtain the converter output voltage reference value.

According to the foregoing line power control method for a unified power flow controller, a phase angle of phase A of the measured line voltage is a reference angle of the dq transformation and the dq reverse transformation.

The foregoing line power control method for a unified power flow controller is applicable to a unified power flow controller that is based on an MMC structure converter.

The foregoing line power control method for a unified power flow controller is applicable to a unified power flow controller whose series side does not include a filter structure.

The present invention further provides a line power control system for a unified power flow controller. The control system includes an outer loop line power control unit, an inner loop valve side current control unit, and a converter valve control unit, where the outer loop line power control unit is configured to generate a valve side current reference value, the inner loop valve side current control unit is configured to generate a converter output voltage reference value according to the valve side current reference value, and the converter valve control unit is configured to output a corresponding voltage according to the voltage reference value to control line power.

According to the foregoing line power control system for a unified power flow controller, the outer loop line power control unit includes a current instruction calculation module, a first measurement module, a second measurement module, an integrator module, and a summation module, where the first measurement module is configured to measure a line alternating voltage;

the second measurement module is configured to measure line power;

the current instruction calculation module is configured to calculate a line current instruction according to an input power instruction and the line alternating voltage that is measured by the first measurement module;

the integrator module is configured to perform a proportional integral operation on a difference between the line power instruction and the line power that is measured by the second measurement module; and the summation module is configured to sum an output value of the integrator module to an output value of the current instruction module to obtain an outer loop valve side current reference value.

According to the foregoing line power control system for a unified power flow controller, the inner loop valve side current control unit includes: a third measurement module, a fourth measurement module, and a calculation module, where the third measurement module is configured to measure a valve side alternating voltage;

the fourth measurement module is configured to measure a valve side alternating current; and the calculation module is configured to calculate the converter output voltage reference value according to the valve side current reference value, the actual alternating voltage that is measured by the third measurement module, and the actual alternating current that is measured by the fourth measurement module.

According to the foregoing line power control system for a unified power flow controller, the outer loop line power control unit further includes a dq transformation module, correspondingly, after the dq transformation module performs transformation on the alternating voltage, and calculation is performed on the transformed voltage and the line power instruction to obtain a dq component of the line current instruction; and a phase angle of phase A of the measured line voltage is a reference angle of the dq transformation.

According to the foregoing line power control system for a unified power flow controller, the inner loop valve side current control unit further includes a dq transformation module and a dq reverse transformation module, where correspondingly, after the dq transformation module performs transformation on the measured valve side alternating current and the measured valve side alternating voltage, calculation is performed on the transformed current, the transformed voltage, a value of a reactor of a bridge, and a dq component of the valve side current reference value to obtain a dq component of the converter output voltage reference value, and then the dq reverse transformation module performs dq reverse transformation on the dq component to obtain the converter output voltage reference value; and a phase angle of phase A of the measured line voltage is a reference angle of the dq transformation and the dq reverse transformation.

By means of the foregoing solutions, the line power control method and system for a unified power flow controller in the present invention can rapidly and accurately control the line power, and can independently control active power and reactive power of a line, and make full use of the feature of the unified power flow controller. The method is simple and has high reliability, and is suitable for engineering application of a unified power flow controller based on an MMC structure. By means of the present invention, decoupling control of the active power and the reactive power of the line is implemented, and the decoupling control together with constant DC voltage control, reactive power control or constant alternating voltage control of a parallel-side converter form a multi-objective coordination strategy of the unified power flow controller. The present invention is also applicable to line power control of an interline power flow controller (IPFC) and a CSC (convertible static compensator).

DETAILED DESCRIPTION

Specific embodiments of the present invention are described in detail below with reference to the accompanying drawings.

The present invention provides a line power control method for a unified power flow controller, outer loop power control performs decoupling control on active power and reactive power of a line, and inner loop AC current control directly control a converter current, so as to improve dynamic performance of the unified power flow controller.

Figure 1:
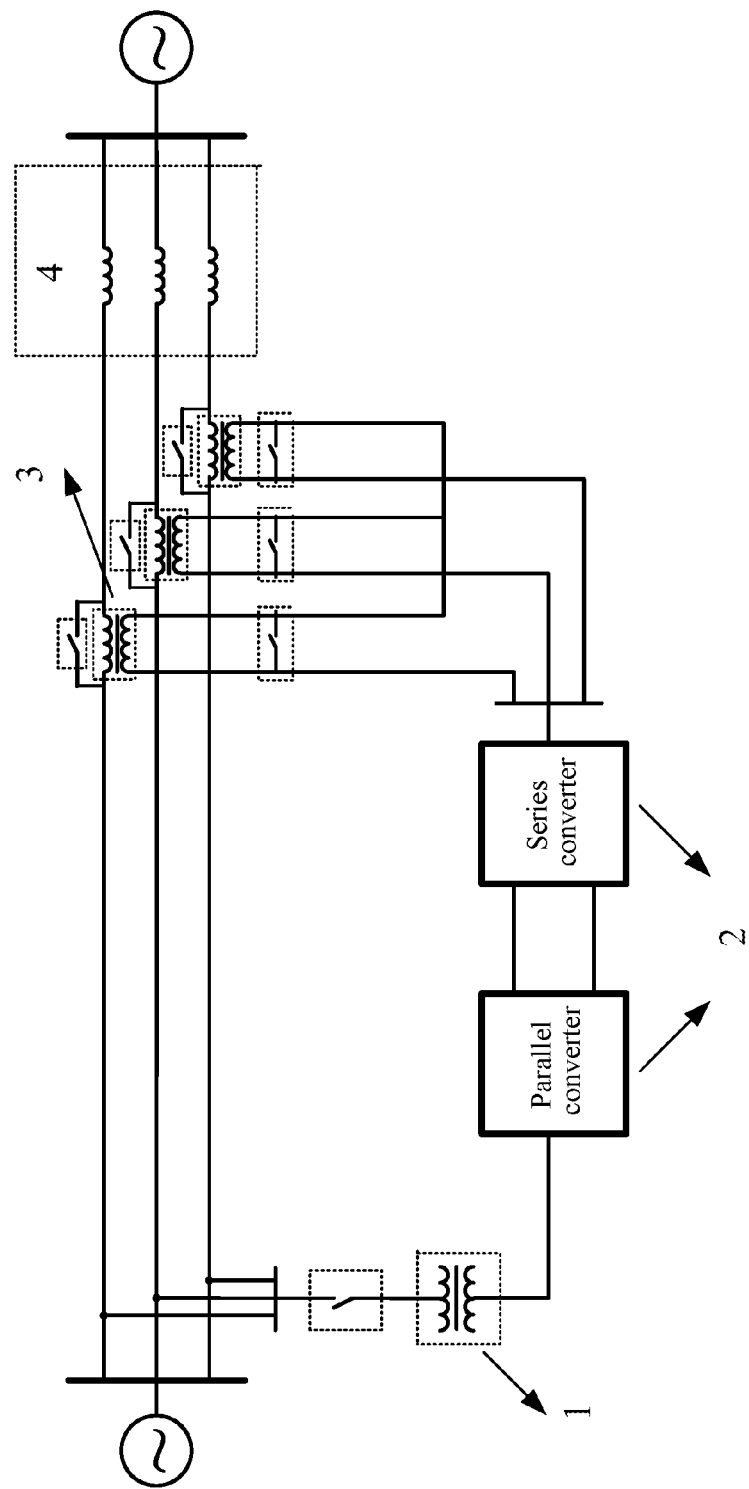
FIG. 1 is an equivalent structural diagram of a unified power flow controller according to the present invention.
Figure 2:
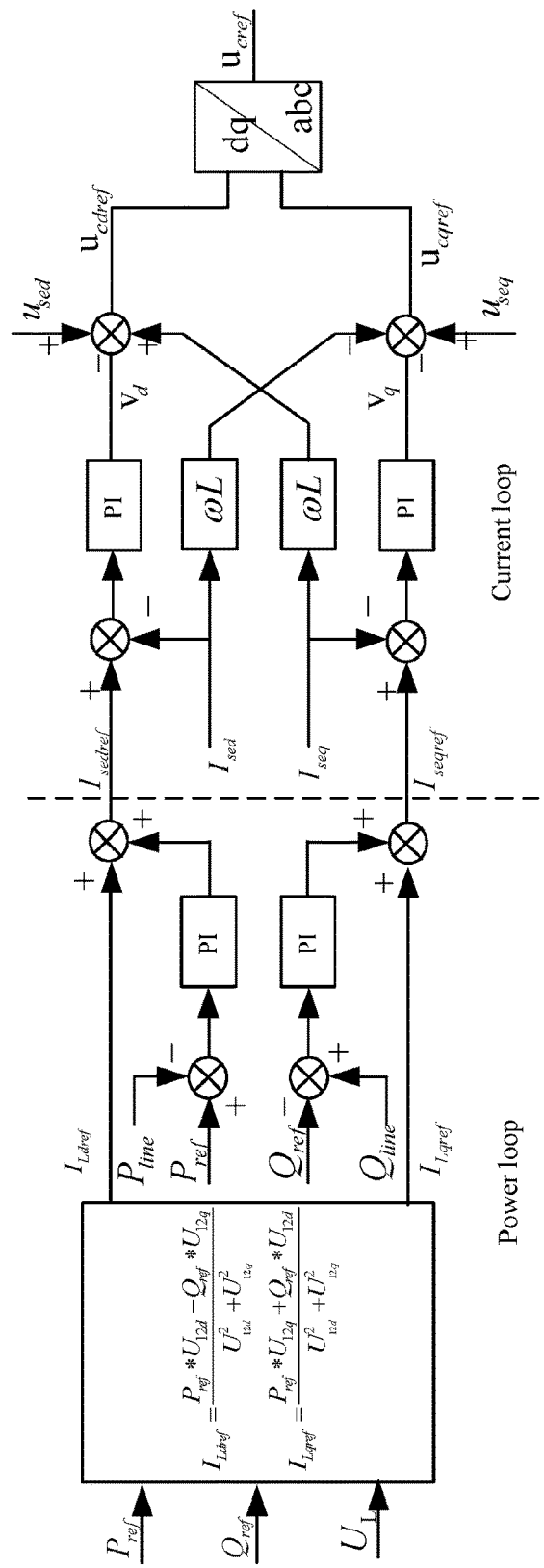
FIG. 2 is a principle diagram of a line power control method according to the present invention.

FIG. 2 is a diagram of a line power control method for a unified power flow controller according to the present invention. The line power control method for the unified power flow controller uses a dual-loop control strategy, including outer loop power control and inner loop valve side current control. Valve side current reference values $I_{sedref}$ and $I_{seqref}$ are generated by means of the outer loop line power control, a converter output voltage reference value $U_{cref}$ is generated by means of the inner loop valve side current control, and finally, a converter outputs a corresponding voltage according to the voltage reference value to control line power.

According to the line power control method for a unified power flow controller, a line current instruction that includes $I_{Ldref}$ and $I_{Lqref}$ is calculated by means of the outer loop line power control according to an input power instruction that includes $P_{ref}$ and $Q_{ref}$ and a measured line alternating voltage $U_L$; the calculated line current instruction and output values obtained by performing a proportional integral operation on differences between a line power instruction and measured line power $P_{Line}$ and $Q_{Line}$ are summed to obtain the valve side current reference values $I_{sedref}$ and $I_{seqref}$.

According to the line power control method for a unified power flow controller, the converter output voltage reference $U_{cref}$ is calculated by means of valve side current control inner loop according to measured valve side alternating currents $I_{sed}$ and $I_{seq}$ and measured valve side alternating voltages $U_{sed}$ and $U_{seq}$.

According to the line power control method for a unified power flow controller, dq transformation is performed on the measured line alternating voltage, and then calculation is performed on the transformed voltage and the line power instruction to obtain a dq component of the line current instruction.

According to the line power control method for a unified power flow controller, after dq transformation is performed on the measured valve side alternating current and the measured valve side alternating voltage, calculation is performed on the transformed current, the transformed voltage, a value of a reactor of a bridge, and a dq component of the valve side current reference value to obtain a dq component of the converter output voltage reference value, and then dq reverse transformation is performed on the dq component to obtain the three-phase alternating voltage reference value of the converter output voltage. According to the line power control method for a unified power flow controller, a phase angle of phase A of the measured line voltage is a reference angle of the dq transformation and the dq reverse transformation.

The line power control method for a unified power flow controller is applicable to a unified power flow controller that is based on an MMC structure converter and a unified power flow controller whose series-side does not include a filter structure.

In addition, the present invention further provides a line power control system for a unified power flow controller. The control system includes an outer loop line power control unit, an inner loop valve side current control unit, and a converter valve control unit. The outer loop line power control unit is configured to generate a valve side current reference value, the inner loop valve side current control unit is configured to generate a converter output voltage reference value according to the valve side current reference value, and the converter valve control unit is configured to output a corresponding voltage according to the voltage reference value to control line power.

The outer loop line power control unit includes a current instruction calculation module, a first measurement module, a second measurement module, an integrator module, and a summation module, where the first measurement module is configured to measure a line alternating voltage;

the second measurement module is configured to measure line power;

the current instruction calculation module is configured to calculate a line current instruction according to an input line power instruction and the line alternating voltage that is measured by the first measurement module;

the integrator module is configured to perform a proportional integral operation on a difference between the line power instruction and the line power that is measured by the second measurement module; and the summation module is configured to sum an output value of the integrator module to an output value of the current instruction module to obtain an outer loop valve side current reference value.

The inner loop valve side current control unit includes: a third measurement module, a fourth measurement module, and a calculation module, where the third measurement module is configured to measure a valve side alternating voltage;

the fourth measurement module is configured to measure a valve side alternating current; and the calculation module is configured to calculate the converter output voltage reference value according to the valve side current reference value, the actual alternating voltage that is measured by the third measurement module, and the actual alternating current that is measured by the fourth measurement module.

The foregoing outer loop line power control unit further includes a dq transformation module, correspondingly, after the dq transformation module performs transformation on the alternating voltage, and calculation is performed on the transformed voltage and the line power instruction to obtain a dq component of the line current instruction; and a phase angle of phase A of the measured line voltage is a reference angle of the dq transformation.

The inner valve side current control unit further includes a dq transformation module and a dq reverse transformation module.

Correspondingly, after the dq transformation module performs transformation on the measured valve side alternating current and the measured valve side alternating voltage, calculation is performed on the transformed current, the transformed voltage, a value of a reactor of a bridge arm, and a dq component of the valve side current reference value to obtain a dq component of the converter output voltage reference value, and then the dq reverse transformation module performs dq reverse transformation on the dq component to obtain the converter output voltage reference value; and a phase angle of phase A of the measured line voltage is a reference angle of the dq transformation and the dq reverse transformation.

The dq transformation is transformation that converts three-phase alternating variables from description of three-phase stationary coordinate system into description of three-phase rotating dq coordinate system. The dq reverse transformation is transformation that converts three-phase alternating variables from description of two-phase rotating dq coordinate system into description of three-phase stationary coordinate system.

The implementation solutions of the present invention are described for a unified power flow controller that is applied to a single line. However, the present invention is not limited to a system in which a unified a unified power flow controller is applied to a single line. The present invention is applicable to a unified power flow controller that is applied to a multiple circuit line or that is applied to multiple lines at different drop points of a same transformer substation or of a same bus; and the present invention is also applicable to line power control of an interline power flow controller and a convertible static compensator. Any line power control method for a unified power flow controller in which line power outer loop and valve side current inner loop are used falls within the scope of the present invention.

It should be finally noted that the above embodiments describe the technical solutions of the present invention, but are not intended to limit the present invention. A person of ordinary skill in the art should understand that variations or equivalent replacements can be made to the specific embodiments of the present invention by a person skilled in the art, and such variations or replacements shall all fall within the protection scope of the appended claims.

The invention claimed is:

1. A line power control method for a unified power flow controller, comprising:
    generating, by means of an outer loop line power control, a valve side current reference value; generating, by means of an inner loop valve side current control, a converter output voltage reference value, according to the valve side current reference value; and outputting, by means of a converter valve control according to the voltage reference value, a corresponding voltage to control line power, wherein
    the generating, by means of outer loop line power control, a valve side current reference value specifically refers to that: calculating a line current instruction by means of the outer loop line power control according to an input power instruction and a measured line alternating voltage, and summing the calculated line current instruction and an output value that is obtained by performing a proportional integral operation on a difference between a line power instruction and measured line power, to obtain an outer loop valve side current reference value; and
    the generating, by means of inner loop valve side current control, a converter output voltage reference value specifically refers to that: calculating the converter output voltage reference value by means of the inner valve side current control according to the valve side current reference value that is input, a measured valve side alternating current, and a measured valve side alternating voltage.

2. The line power control method for a unified power flow controller according to claim 1, wherein after dq transformation is performed on the measured line alternating voltage, calculation is performed on the transformed voltage and the line power instruction to obtain a dq component of the line current instruction, correspondingly, a line current instruction that is used for summation is the dq component of the line current instruction.

3. The line power control method for a unified power flow controller according to claim 1, wherein after dq transformation is performed on the measured valve side alternating current and the measured valve side alternating voltage, calculation is performed on the transformed current, the transformed voltage, a value of a reactor of a bridge, and a dq component of the valve side current reference value to obtain a dq component of the converter output voltage reference value, and then dq reverse transformation is performed on the dq component to obtain the converter output voltage reference value.

4. The line power control method for a unified power flow controller according to claim 2, wherein a phase angle of phase A of the measured line alternating voltage is a reference angle of the dq transformation.

5. The line power control method for a unified power flow controller according to claim 3, wherein a phase angle of phase A of the measured line alternating voltage is a reference angle of the dq transformation and the dq reverse transformation.

6. The line power control method for a unified power flow controller according to claim 1, wherein the line power control method is applicable to a unified power flow controller that is based on an MMC structure converter.

7. The line power control method for a unified power flow controller according to claim 1, wherein the line power control method is applicable to a unified power flow controller whose series side does not include a filter structure.

8. The line power control method of claim 1,
    the outer loop line power control unit comprises a current instruction calculation module, a first measurement module, a second measurement module, an integrator module, and a summation module, wherein
    the first measurement module is configured to measure a line alternating voltage,
    the second measurement module is configured to measure line power,
    the current instruction calculation module is configured to calculate a line current instruction according to an input line power instruction and the line alternating voltage that is measured by the first measurement module,
    the integrator module is configured to perform a proportional integral operation on a difference between the line power instruction and the line power that is measured by the second measurement module, and the summation module is configured to sum an output value of the integrator module to an output value of the current instruction module to obtain an outer loop valve side current reference value; and the inner loop valve side current control unit comprises: a third measurement module, a fourth measurement module, and a calculation module, wherein the third measurement module is configured to measure a valve side alternating voltage;

the fourth measurement module is configured to measure a valve side alternating current; and the calculation module is configured to calculate the converter output voltage reference value according to the valve side current reference value, the valve side alternating voltage that is measured by the third measurement module, and the valve side alternating current that is measured by the fourth measurement module.

9. The line power control method according to claim 8, wherein the outer loop line power control unit further comprises a dq transformation module, and correspondingly, after the dq transformation module performs transformation on the measured line alternating voltage, and calculation is performed on the transformed voltage and the line power instruction to obtain a dq component of the line current instruction; and a phase angle of phase A of the measured line alternating voltage is a reference angle of the dq transformation.

10. The line power control method according to claim 8, wherein the inner loop valve side current control unit further comprises a dq transformation module and a dq reverse transformation module;

correspondingly, after the dq transformation module performs dq transformation on the measured valve side alternating current and the measured valve side alternating voltage, calculation is performed on the transformed current, the transformed voltage, a value of a reactor of a bridge, and a dq component of the valve side current reference value to obtain a dq component of the converter output voltage reference value, and then the dq reverse transformation module performs dq reverse transformation on the dq component to obtain the converter output voltage reference value; and a phase angle of phase A of the measured line alternating voltage is a reference angle of the dq transformation and the dq reverse transformation.

* * * * *